June 18, 1968  R. A. FLYNN ETAL  3,389,197
METHOD OF FORMING FOAMED CONTAINER
Filed Dec. 30, 1965  4 Sheets-Sheet 1
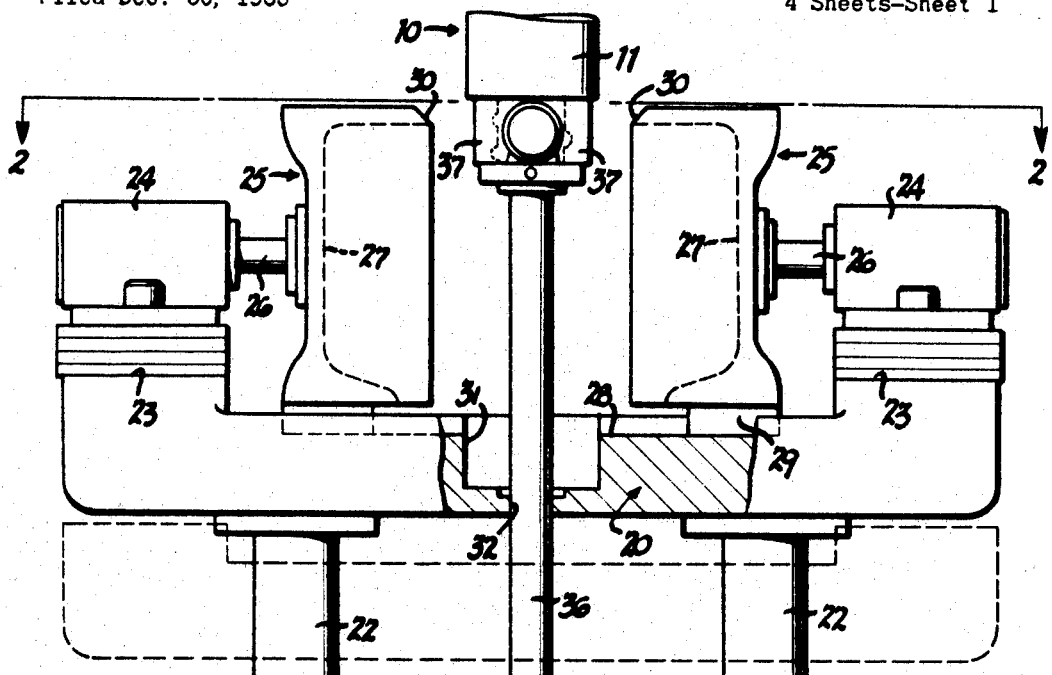
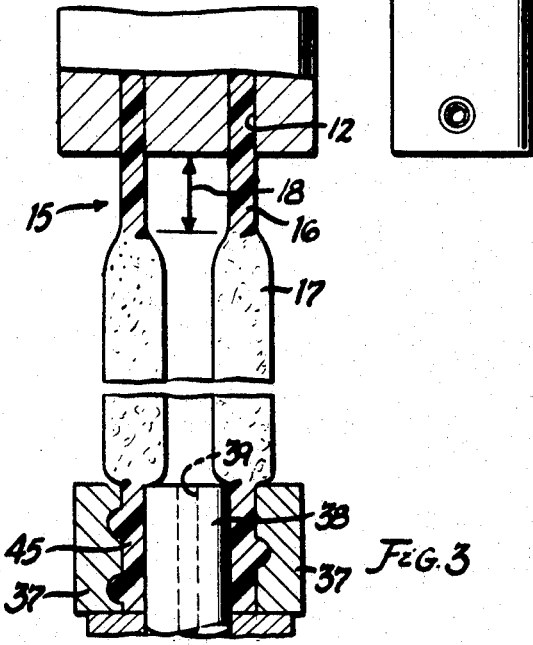
FIG. 1
FIG. 3
Inventors
ROBERT A. FLYNN
CHARLES E. PLYMALE
By Philip M. Rice
& W. A. Schaich
ATT'YS.

Inventors
ROBERT A. FLYNN
CHARLES E. PLYMALE
By Philip M. Rice
& W. A. Schaich
Att'ys.

Inventors
ROBERT A. FLYNN
CHARLES E. PLUMALE
By
Attys.

Inventors
ROBERT A. FLYNN
CHARLES E. PLYMALE
By Philip M. Rice
& W. A. Schaich
Att'ys.

United States Patent Office 3,389,197
Patented June 18, 1968

3,389,197
METHOD OF FORMING FOAMED CONTAINER
Robert A. Flynn and Charles E. Plymale, Maumee, Ohio, assignors to Owens-Illinois, Inc., a corporation of Ohio
Filed Dec. 30, 1965, Ser. No. 517,711
9 Claims. (Cl. 264—45)

The present invention relates to a method of making a blown plastic container from a foamed plastic material. More particularly, this invention relates to a method of making a blown plastic container from a foamable plastic composition, the container having critical portions thereof in a solid nonfoamed state.

In the manufacture of blown plastic articles, it has been suggested that such articles be made of foamed plastic materials so that a lightweight, thermally insulating, strong container can be obtained. However, it has been found that certain critical areas of the container cannot be foamed, since such areas as the container finish must be made to exacting dimensional specifications to insure the dispensing of the container contents and also to insure sealing engagement with a cap or the like. Another critical area of the container is the "pinch-off" area of the bottom wall of the container, this area being that at which the tubular parison is pinched shut to form the blowable bubble or blank from which the container is blown.

It has been well known in the art that foamable plastic compositions can be readily obtained by the dissolving of gases such as nitrogen, carbon dioxide, helium and argon in suitable plastic compositions, such as polyethylene, polystyrene or the like.

By dissolving such gases into the plasticized molten plastic material as it is retained under heat and pressure in a plasticizer-extruder, and then issuing the composite material from an extrusion orifice into the open air, the gaseous material expands and forms cells in the extruded product. It has also been recently discovered that by incorporating a nucleating agent into the plasticized material, the degree, rate and quality of foaming can be rather closely controlled.

For example, suitable nucleators may include a molten metal, such as tin; an organic material, such as azodicarbamide; metallo-organic materials such as metal formates, acetates or oxilates; or a metal salt, such as mercurous chloride. Such materials preferably are present as extremely minute particles, on the order of less than 0.0001 inch, or 2.54 microns in size and are present in an amount equivalent to 1.0 percent or less of the total composition, and preferably within the range of 0.01 percent to 0.10 percent by weight.

In operation, the metallic components function as hot spot producers because their specific heat is much greater than the polymer and because their compressibility is much less. As the extrudate emerges from the extruder orifice, the polymer swells and as it swells becomes slightly cooler. The metal particles are much less readily compressed within the extruder and, therefore, do not swell and cool as they emerge from the extruder. In effect, they become relatively hotter than the polymer. The gaseous expansion thus occurs at the location of these local hot spots. Further, the actual foaming takes place outside the extrusion orifice and after the initial cooling of the extrudate has occurred to produce the hot spots.

Thus, it has become possible to much more closely control the process of foaming in the extrusion of plasticized materials, this control not only increasing the degree and fineness of the cell formation but also yielding a control over the rate of foaming not heretofore obtainable.

The present invention now proposes the manufacture of a blown plastic container formed of a foamed plastic material and in which critical areas of the container are not foamed, but rather are specifically molded into a non-foamed condition.

This method is carried out by engaging successive portions of an extruded parison with separate and distinct mold portions as the parison issues from an extrusion orifice, and prior to foaming of the extrudate. Preferably, such engagement occurs at the extremities of the tubular parison formed at the extrusion orifice, and, again preferably, the so-engaged portions of the parison become those portions of the final container which define the finish and the pinch line thereof. The remaining nonengaged portions of the extrudate are free to assume their foamed configuration, either before or after the introduction of blow air so that, in the final product, the blown portions thereof are foamed. Since such foamed portions form the majority of the container body portion, all of the thermal, structural and economic advantages of foamed containers can be obtained without the disadvantages inherent in fully foamed containers.

It is, therefore, an important object of the present invention to provide a new and useful method of making a blown plastic container from a plasticized material capable of foaming.

Another advantage of the present invention is the method of making a plastic article, such as a container, wherein critical areas of the article are of nonfoamed material while other portions of the article are foamed.

Yet another important object of the present invention is the provision of a method of making a blown plastic article, such as a container, by extruding a foamable plastic composition as a tubular parison from an extrusion orifice, the composition being foamed only after exposure beyond the orifice and engaging terminal portions of the parison with separate mold parts to prevent foaming thereof, allowing intermediate portions of the parison to foam, and blowing the foamed portions.

Still another, and no less important, object of the present invention is a method of making a blown plastic container having terminal finish and pinch portions by extruding a normally foamable plastic composition from an annular orifice to form a parison, successively engaging leading and trailing portions of the parison to prevent foaming thereof, allowing intermediate portions of the parison to foam, and finally blowing the intermediate parison portions to form a container in which the terminal portions form the finish and the pinch portion of the container.

Other objects of this invention will appear in the following description and appended claims, reference being had to the accompanying drawings forming a part of this specification wherein like reference characters designate corresponding parts in the several views.

On the drawings:

FIGURE 1 is a side elevational view, with parts shown in section, of a device capable of carrying out the method of the present invention;

FIGURE 3 is an enlarged fragmentary view, similar to FIGURE 1, illustrating an adjusted position of the device during the carrying out of the method of the present invention;

Figure 4:
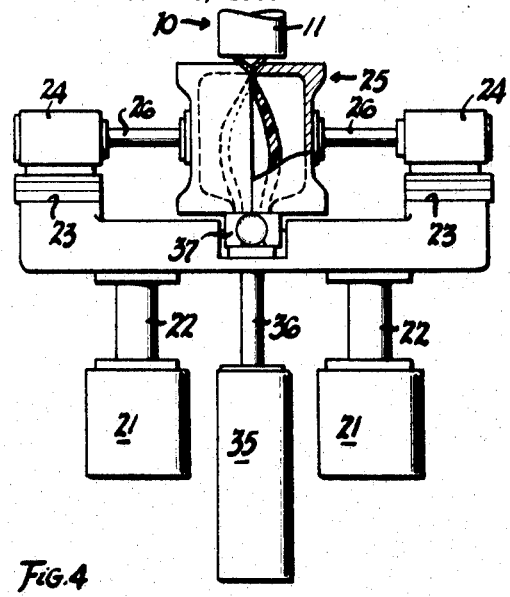
FIGURES 4 and 5 are successive operational views illustrating successive steps in a method of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, the numeral 10 refers generally to a plasticizer-extruder having vertical orifice block 11 surrounding a downwardly directed annular extrusion orifice 12 (FIGURE 3) from which issues a depending, downwardly directed, annular extrudate indicated generally at 15. This extrudate 15 is tubular and forms the parison or preform from which the final article is to be formed. Preferably, the extrudate 15 is of thermoplastic material, such as polystyrene, polyethylene or the like, having incorporated therein various foaming ingredients. Further, the extrudate 15 preferably incorporates therein a gaseous blowing medium, such as heretofore described, and a nucleating agent of the types and of the amounts heretofore described.

Initially, it will be noted from FIGURE 3 of the drawings that the tubular extrudate 15 is retained in the plasticizer extruder 10 under elevated temperatures and at elevated pressures so that it issues from the orifice 12 in substantially nonfoamed condition, this portion of the extrudate being denominated by reference numeral 16 in FIGURE 3. After the extrudate has been exposed to ambient, substantially atmospheric conditions of heat and pressure, the nucleating agent and the gaseous blowing medium cause the extrudate to foam and to become cellular. This portion of the extrudate is indicated at reference numeral 17 in FIGURE 3 of the drawings. It will be noted that for some predetermined distance 18 exterior to the orifice, the extrudate 15 is in its nonfoamed condition 16. This distance 18 is a function of time primarily, although other conditions enter therein, but it is well known that delayed foaming can be obtained by the techniques heretofore described.

Figure 2:
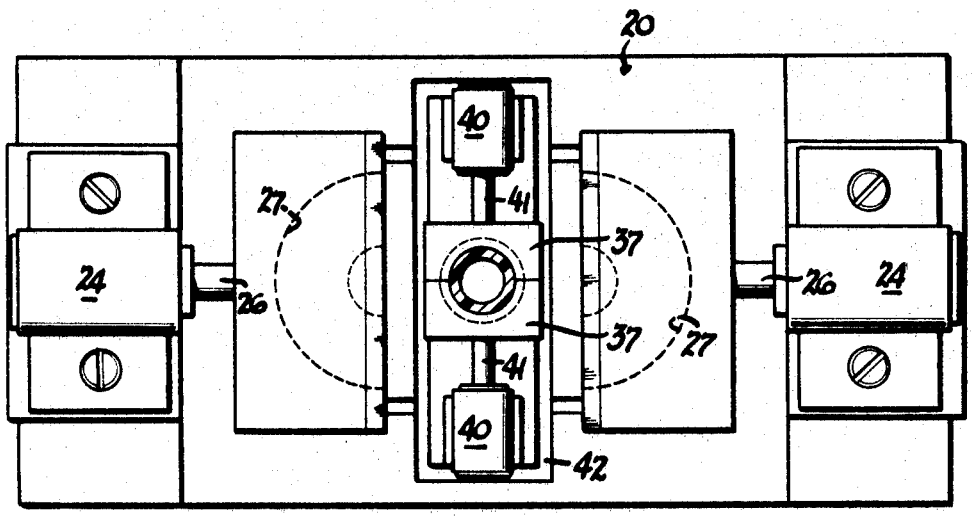
FIGURE 2 is a sectional view taken on the plane 2—2 of FIGURE 1.

Positioned beneath the orifice, and as best illustrated in FIGURES 1 and 2 of the drawings, is a mold table indicated generally at 20, this table preferably being rectangular in plan configuration and being provided with vertical actuating means including a pair of fluid pressure actuated cylinders 21 each having a piston rod 22 connected to the under surface of the table 20.

The table is provided with transversely spaced support platforms 23 upon which are secured transversely spaced, confronting actuating cylinders 24 connected to blow mold sections 25 by actuating pistons 26. These blow mold sections 25 are complementary to one another and, in combination, define an interior mold space 27 conforming generally to the body of the finished article, such as a container, which is desired. The blow mold sections 25 are guided for transverse motion between their positions of FIGURE 1 and FIGURE 4, respectively, in guide slots 28 within which guide projections 29 integral with or secured to the blow mold sections are guided. Each of the upper extremities of the blow mold sections 25 is provided with a pinching edge 30 which is engageable with the tubular extrudate 15 when the mold sections are actuated to their centralized blow molding position, as illustrated in FIGURE 4.

The central portion of the support plate 20 is provided with an upwardly opening recess 31 vertically registering with the orifice 12 and communicating through a bore 32 with the undersurface of the plate. A fluid pressure cylinder 35 underlies the plate 20 and has its actuating piston rod 36 projecting through the aperture 32, this piston carrying at its upper end a pair of separable neck mold sections 37, these neck mold sections being transversely actuated for separatory movement. The neck mold sections surround a central core pin 38 having an axial bore 39 connected to a source of blowing air under pressure.

As shown in FIGURE 2 of the drawings, the neck mold sections 37 are actuated for transverse separatory motion by actuating cylinders 40 and piston rods 41 mounted on a platform 42 carried by the piston rod 36.

*Operation of the embodiments of FIGURES 1 through 5*

As illustrated in FIGURE 1 of the drawings, initiation of the method takes place when the mold table 20 is elevated by the cylinders 21, and the rod 36 of the cylinder 35 is elevated to position the neck mold sections 37, surrounding the core pin 38, in contact with the orifice block 11.

Preferably, the plasticizer-extruder 10 is capable of intermittently issuing plasticized material. For example, the plasticizer-extruder 10 may be of the reciprocating screw-type, an accumulator chamber may be provided for accumulating the material to form the extrudate 15, or an on-off valve arrangement may be provided.

In any event, the first material issuing from the orifice 12 enters the mold space 45 defined intermediate the neck mold sections 37 and the core pin 38. This material enters the mold space and is confined therein under extrudate pressure before the extrudate has had an opportunity to expand to a foamed configuration. Since the neck mold sections 37 and the core pin 38 are formed of a metallic material capable of chilling the extrudate and, since a coolant (such as water) is normally circulated through the neckmold sections 37 by conventional means (not shown), the material filling the neck mold cavity remains in a nonfoamed condition.

Next, the cylinder 35 is actuated to downwardly withdraw the piston rod 36 while additional material is issued from the orifice 12 to form the blowable portions of the parison as illustrated in FIGURE 3 of the drawings. Since this portion of the parison is extruded into the open air and at ambient, substantially atmospheric heat and pressure conditions, the extrudate expands, as indicated at 17, to a cellular configuration.

When the neckmold sections 37 have been retracted vertically sufficiently to enter the recess 31 and to be bottomed therein, the cylinders 24 are actuated to close the blow mold sections 25 upon the extruded parison. Such closure of the blow molds will not interfere with the previously foamed parison sections 17, and the pinching edges 30 of the blow molds 25 will contact the extrudate portions 16, which portions have not yet expanded to their cellular configuration, so that the non-foamed portions of the parison will be contacted by the pinching edges to close the parison to form a blowable bubble as best illustrated in FIGURES 4 and 5 of the drawings.

Figure 5:
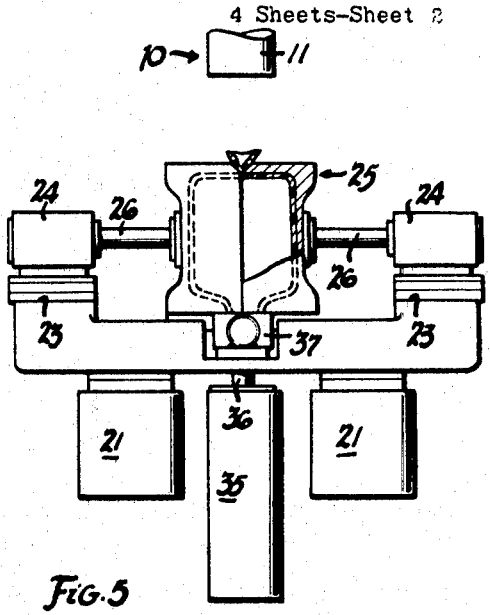

Next, the table cylinders 21 are actuated to retract the table 20 downwardly, as will readily be seen by a comparison of FIGURES 4 and 5 of the drawings. This downward retraction of the table will pull from the orifice the extrudate issued therefrom between the period of closing the blow molds and the downward actuation of the cylinders 21.

At the same time, the issuance of extrudate from the orifice is terminated.

At any time after the blow mold sections 25 have been closed, blow air under pressure may be introduced through the passage 39 to inflate the foamed portions of the parison to the configuration of the blow mold cavity 27, thereby forming the complete container.

The blown article is retained in the closed blow molds 25 and the closed neck mold sections 37 until such time as the article becomes thermally stable, and it can be removed from the molding apparatus by actuating the cylinders 24 to return the blow mold sections 25 to their opened positions of FIGURE 1 and by actuating the neck mold cylinders 40 to retract the pistons 41 and the neck mold sections 37 transversely. Finally, the article is removed manually or automatically from the blow pin 38.

*The embodiment of FIGURES 6 through 9*

In that embodiment of the invention illustrated in FIGURES 6 through 9, reference numeral 50 refers generally to a plasticizer-extruder of the same general type so that described in connection with the earlier embodiment of the invention, with the exception that the annular extrusion orifice 51 surrounds an annular inner tube which, in turn, surrounds a vertically reciprocable blow pipe 53, this blow pipe having an axial bore 54 therethrough connected to a source of blow air. The blow pipe 53 forms extensible piston rod of an upper vertically extending actuating cylinder 55. Thus, the blow pipe 53 can be extended vertically downwardly beyond its retracted position of FIGURE 6 upon actuation of cylinder 55, this extended position being illustrated in FIGURE 8.

Figure 6:
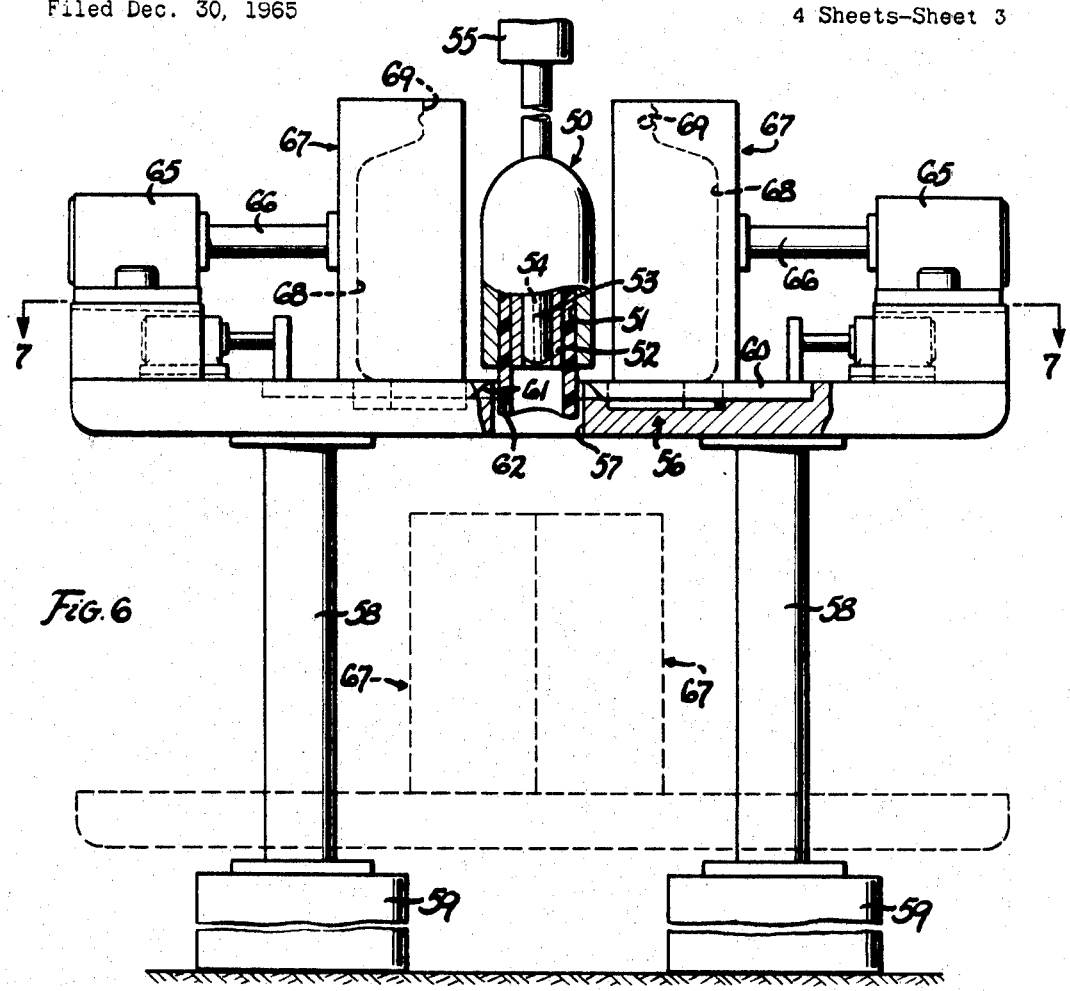
FIGURE 6 is a view similar to FIGURE 1, but illustrating a modified form of the present invention.
Figure 7:
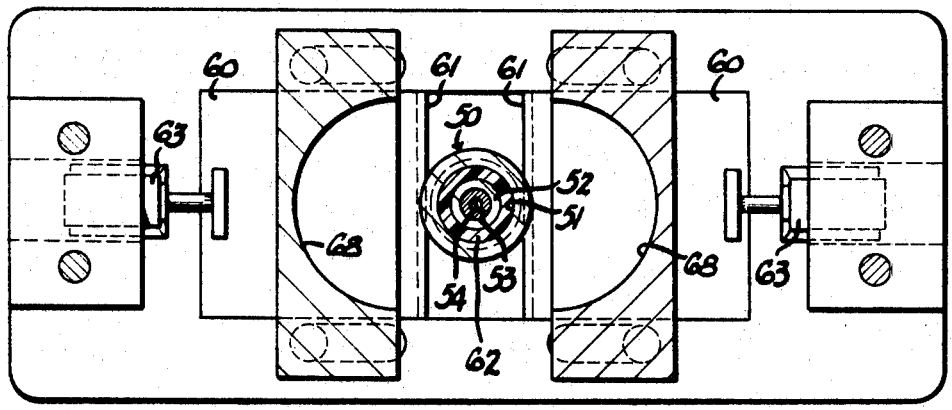
FIGURE 7 is a sectional view taken along the plane 7—7 of FIGURE 6.

Generally underlying the orifice 51 is a mold table 56 having a central aperture 57 aligned with the orifice 51, the mold table being mounted for vertical reciprocatory motion on piston rods 58 actuated by fluid pressure actuated cylinders 59, the table being movable vertically between its solid line and dotted line positions of FIGURE 6.

Carried by the mold table 56 for relative transverse sliding motion, are a pair of mold bottom plates 60, these bottom plates having confronting inclined inner pinching edges 61 which are actuable toward one another to pinchingly engage the extrudate 62 issuing downwardly from the orifice 51. The mold plates 60 are actuated into such pinching engagement by actuating cylinders 63 mounted on the mold table. Superimposed over the cylinder 63 are blow mold actuating cylinders 65 having inwardly projecting piston rods 66 carrying at their inner ends blow mold sections 67, these separable blow mold sections having interior cavities 68 which define the final shape of the blown article, including, in the case of a container, upper finish-defining portions 69.

*Operation of the embodiment of FIGURES 6–9*

As best shown in FIGURE 6 of the drawings, the mold table 56 is initially elevated to a position directly underlying the orifice 51 as the initial extrusion of extrudate 62 from the orifice 51. This extrudate passes into the mold table aperture 57. Next, the cylinders 63 are actuated to displace the plates 60 toward one another and into pinching engagement with the extrudate immediately beneath the orifice 51. The extrudate at this time is not in its foamed condition, so that the pinching occurs prior to any foaming.

Figure 8:
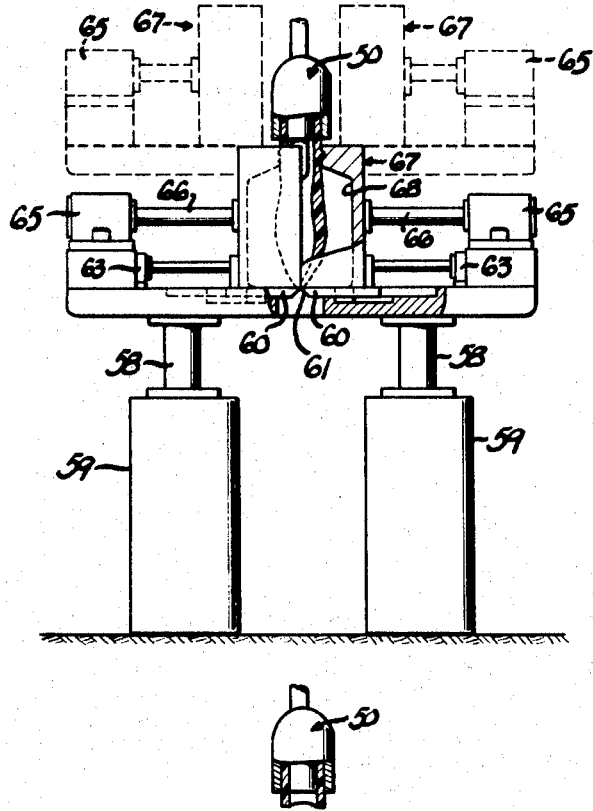
FIGURES 8 and 9 are successive views, similar to FIGURE 6, illustrating successive steps in the method of the present invention.
Figure 9:
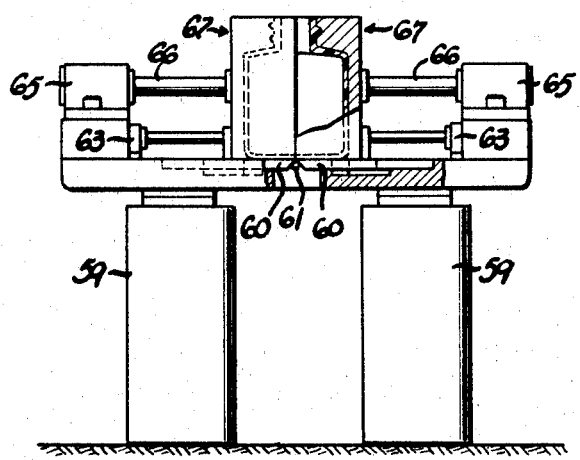

Next, the mold table 56 is lowered toward its dotted line position of FIGURE 6, the blow molds 67 remaining in their open or retracted positions of FIGURE 6. After a length of extrudate has been issued from the orifice 51 sufficient to form a parison for the article, the blow molds 67 are closed upon the extrudate, but only after the blow pipe 53 has been vertically extended beyond the confines of the orifice 51 and into the freshly extruded extrudate depending from the orifice 51. Thus, when the blow molds are closed onto the extrudate, as illustrated in FIGURE 8 of the drawings, the last-issued portion of the extrudate is compression molded between the finish-defining portions 69 of the blow molds 67 and the blow pin 53. This last-extruded portion, at the time of its compression molding, has not yet foamed and, therefore, the compression molded finish is formed of nonfoamed, noncellular material.

The remaining portion of the operating cycle is similar to that heretofore described in connection with the embodiment of FIGURES 1 through 5, inclusive, in that the plates 60 and the mold sections 67 remain closed upon the inflated parison until such time as the final article is thermally stable, and the blow molds and plates are then opened and the blow pin 53 vertically retracted to free the article for removal from the apparatus. The cylinders 59 are then actuated to elevate the table 56 to its solid line position of FIGURE 6, and the next cycle of operation is initiated.

*Summary*

Thus, it will be seen that the present invention proposes a new and novel method for the manufacture of composite plastic articles having blown portions which are cellular in structure and having noncellular nonblown portions. Thus, in the case of a container, the finish and the pinch line at the opposite extremities of the container are formed of nonfoamed material, while the intermediate blow molded parts are cellular in structure.

The method of the present invention accomplishes this by moldingly engaging the extremities of the parison before these portions of the parison have had an opportunity to assume a cellular structure. As a result, better quality articles are obtained and the composite article has all of the structural advantages of a noncellular article, and all of the economic and insulating qualities of a foamed structure.

We claim as our invention:

1. In a method of making a blown plastic container from a foamable plastic composition issued as a tubular parison from an extrusion orifice in a plasticized nonfoamed state but capable of foaming when exposed to ambient, substantially atmospheric pressure and temperature conditions for a predetermined relatively short period of time, the improvements of separately forming terminal portions of said parison prior to foaming thereof into the finish and the bottom, respectively, of the container, and blowing the intermediate portion of said parison into the remainder of the container independently of any foaming which may occur therein prior to blowing.

2. In the method of claim 1, the further improvements of enclosing one terminal portion of said parison in a finish-defining mold portion prior to foaming of said portion and pinching the other terminal portion of the same parison between separate and distinct mold portions prior to foaming of said other terminal parison portion.

3. In the method of claim 2, the further improvements of vertically extruding the parison, forming the leading edge of the parison into the container finish, and pinching the trailing end of the parison.

4. In the method of claim 2, the further improvements of vertically extruding the parison, pinching the leading end of the parison, and forming the trailing end of the parison into the container finish.

5. In the method of claim 2, the further improvements of initially extruding the parison into a finish mold prior to foaming thereof, moving the finish mold away from the parison while extruding intermediate portions of the parison and allowing the same to expand to a cellular configuration, and finally pinching the trailing end of the parison prior to foaming thereof.

6. In the method of claim 2, the further improvements of vertically extruding the parison, engaging a leading portion of the parison immediately adjacent the orifice prior to foaming thereof, extruding an intermediate portion of the parison while leaving said intermediate portion free to expand to a cellular configuration, and compression molding the trailing end of the extruded parison before said trailing end can expand to a cellular configuration.

7. In a method of making a blown plastic container or the like from a plasticized material capable of foaming to a cellular configuration when exposed under ambient, substantially atmospheric pressure and temperature conditions, the steps of (1) vertically extruding the plasticized material from an annular orifice to normally form a tubular blowable parison, (2) engaging first separable mold parts with a leading portion of the parison immediately adjacent the orifice, thereby preventing foaming of the engaged leading portion of said parison while forming the same to the configuration of a portion of the final article, (3) extruding into the open air an intermediate portion of said parison, which intermediate portion foams to a cellular configuration, (4) engaging the trailing end of the parison with second separable mold parts immediately adjacent the orifice, thereby preventing foaming of the engaged trailing portion of the parison while forming the same to the configuration of a second portion of the final article, and (5) blow molding the intermediate portion of said parison only to the configuration of the remainder of said article.

8. In a method of making a blown plastic container as defined in claim 7, the further improvements wherein said leading portion of the parison is engaged with a finish-defining mold and the trailing end of the parison is engaged with means for pinching the parison shut to form a blowable bubble therefrom.

9. In a method of making a blown plastic container as defined in claim 7, the further steps of engaging the leading portion of the parison between pinch plates to close the leading end of the parison and engaging the trailing end of the parison between parts of a compression mold, the compression mold forming the container finish at the trailing end of said parison.

No references cited.

JAMES A. SEIDLECK, *Primary Examiner.*

P. E. ANDERSON, *Assistant Examiner.*